(12) United States Patent
Herrmann

(10) Patent No.: US 9,464,728 B2
(45) Date of Patent: Oct. 11, 2016

(54) SOLENOID VALVE

(71) Applicant: Robert Bosch GmbH, Stuttgart (DE)

(72) Inventor: Ralf Herrmann, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 14/400,254

(22) PCT Filed: Mar. 19, 2013

(86) PCT No.: PCT/EP2013/055629
§ 371 (c)(1),
(2) Date: Nov. 10, 2014

(87) PCT Pub. No.: WO2013/167305
PCT Pub. Date: Nov. 14, 2013

(65) Prior Publication Data
US 2015/0097128 A1 Apr. 9, 2015

(30) Foreign Application Priority Data
May 8, 2012 (DE) .......................... 10 2012 207 584

(51) Int. Cl.
*F16K 31/00* (2006.01)
*F16K 31/06* (2006.01)

(52) U.S. Cl.
CPC ......... *F16K 31/003* (2013.01); *F16K 31/0655* (2013.01)

(58) Field of Classification Search
CPC ....................... F16K 31/003; F16K 31/0655
See application file for complete search history.

(56) References Cited

U.S. PATENT DOCUMENTS 1,434,637 A * 11/1922 Tuck ................... F16K 31/0679
236/75
1,700,029 A * 1/1929 Dady .................. F16K 31/0679
251/75

(Continued)

FOREIGN PATENT DOCUMENTS

| CN | 1603668 | 4/2005 |
|---|---|---|
| CN | 101555958 | 10/2009 |

(Continued)

OTHER PUBLICATIONS

International Search Report for Application No. PCT/EP2013/055629 dated Jun. 28, 2013 (English Translation, 3 pages).

*Primary Examiner* — Eric Keasel
(74) *Attorney, Agent, or Firm* — Michael Best & Friedrich LLP

(57) ABSTRACT

The invention relates to a solenoid valve (100), which has a valve rod (141), an electromagnetic actuation device (131, 135, 139) for deflecting the valve rod (141) starting from a first switching position into a second switching position, and a support device (110, 210, 310, 410) for supporting the valve rod (141). The support device (110, 210, 310, 410) has a different form depending upon the deflection of the valve rod (141). The solenoid valve (100) further comprises a locking device (121, 122, 123, 125), which is designed to move a moveable holding element (121) into a locking position upon activation of the electromagnetic actuation device (131, 135, 139) in order to deflect the valve rod (141) into the second switching position, in which locking position the holding element (121) lies against the support device (110, 210, 310, 410), and is designed to move the holding element (121) away from the locking position upon deactivation of the electromagnetic actuation device (131, 135, 139).

10 Claims, 6 Drawing Sheets

(56) References Cited

U.S. PATENT DOCUMENTS

| | | | | |
|---|---|---|---|---|
| 1,783,515 | A | * | 12/1930 | Montgomery ...... F16K 31/0679 251/129.1 |
| 3,771,760 | A | * | 11/1973 | Sheldon .................. F16K 31/06 251/75 |
| 5,564,458 | A | | 10/1996 | Roth et al. |
| 6,328,276 | B1 | * | 12/2001 | Falch .................. F16K 31/0696 251/129.19 |
| 8,308,129 | B2 | * | 11/2012 | Strange .................. F16K 31/56 251/129.19 |
| 8,925,568 | B2 | * | 1/2015 | Legaspi .............. F16K 31/0675 251/113 |

FOREIGN PATENT DOCUMENTS

| | | |
|---|---|---|
| CN | 102086826 | 6/2011 |
| DE | 4438250 | 5/1996 |
| DE | 19753575 | 6/1999 |
| DE | 19754257 | 6/1999 |
| EP | 1538379 | 6/2005 |
| JP | 2001514600 | 9/2001 |
| WO | 2004/085896 | 10/2004 |
| WO | 2008056101 | 5/2008 |

* cited by examiner

SOLENOID VALVE

BACKGROUND OF THE INVENTION

The invention relates to a solenoid valve, which has an electromagnetically actuated valve rod. The valve rod can be deflected starting from a first switching position into a second switching position.

Solenoid valves which can be electrically actuated are used, for example, for switching coolant circuits in cooling systems of motor vehicles. Such valves can assume stable switching positions in the respective end positions thereof (i.e. degenergized or energized), whereby "digital" switching operations can be achieved. Known solenoid valves have a deflectable valve rod, on which a ferromagnetic armature and (at least) one closing element in the form of a sealing cone are disposed. By energizing a field coil, the armature and an associated ferromagnetic opposite pole can be magnetized, whereby a force of attraction between said components and thereby a deflection of the valve rod starting from a first switching position into a second switching position can be brought about. The closing element disposed on the valve rod can thereby be moved into a valve seat or be removed from the same. With the aid of a return spring and/or as a result of the hydraulic pressure of a coolant, the valve rod can again return back into a first starting position when power is switched off to the solenoid valve. Valves working according to this principle, which are available as a normally open valve or as a switching valve, are described in the German patent specification DE 197 54 257 A1, the European patent specification EP 0 653 990 B1 and the German patent specification DE 197 53 575 A1.

A disadvantage of conventional solenoid valves is a relatively high, permanent current consumption in the energized switching position. The use of a cut-off valve in a vehicle cooling system can, for example, require a closing force in the range of 20N in order to hold the valve closed against the force of the return spring and against the hydraulic pressure. In the case of an on-board voltage of 12V, this can be associated with a permanent current consumption in the range of 1 A. Because no mechanical work is performed in the closed valve state, the electrical power in the field coil of the valve is completely converted into heat. This power loss makes it difficult to use such a cut-off valve in modern, efficiency-optimized vehicles. The dimensioning of the coil is also substantially determined by the aforementioned thermal boundary condition.

In contrast, solenoid valves have the advantage of behaving reliably in the event of a fault (fail-safe function) because the valves independently switch into a stable, secure switching position (for example: open) when a loss of the electrical power supply occurs (for example as a result of contact interruption, voltage drop, cable breakage, plug separation, etc.). In the case of valves which are designed differently and in which there is no electrical power consumption in stable switching positions, said fail-safe function cannot be realized to date or can only be implemented with the aid of auxiliary mechanisms (which in turn are associated with a high permanent current consumption). For that reason, solenoid valves continue to be widely used in motor vehicle cooling systems despite the high power electrical power loss associated with the use thereof

SUMMARY OF THE INVENTION

The aim of the invention is to specify an improved solenoid valve, with which a high permanent current consumption can be prevented in a switching position while fully implementing a fail-safe function.

According to the invention, a solenoid valve is proposed which has a valve rod, an electromagnetic actuation device for deflecting the valve rod starting from a first switching position into a second switching position, and a support device for supporting the valve rod. The support device has a different form depending upon the deflection of the valve rod. The solenoid valve further comprises a locking device, which is designed to move a moveable holding element into a locking position upon activation of the electromagnetic actuation device in order to deflect the valve rod into the second switching position, in which locking position the holding element lies against the support device; and said locking device is designed to move the holding element away from the locking position upon deactivation of the electromagnetic actuation device.

In the solenoid valve, the valve rod can be deflected starting from the first into the second switching position by activating the electromagnetic actuation device. The deflection of the valve rod, which can occur against a restoring force (for example produced by a return spring and/or as a result of a hydraulic pressure), is associated with a change in the form of the support device. The activation of the electromagnetic actuation device further results in the locking device moving the holding element into the locking position so that the holding element rests against the support device. In so doing, the holding element can counteract an (oppositely directed) change in the form of the support device and thereby lend said support device an enhanced stability or strength. In this state, the valve rod that is supported by the support device can be reliably held in the second switching position. The locking of the support device and thereby the valve rod, which was implemented in this manner, makes it possible to largely reduce an electrical energy supply to the solenoid valve after the second switching position has been reached, said energy supply being used to activate the actuation device and thus to deflect the valve rod. A relatively small (respectively minimum) electrical energy supply can ensure that the holding element remains in the locking position.

The solenoid valve furthermore exhibits a reliable behavior in the event of a fault. If the reduced electrical energy supply used to retain the holding element in the locking position is cut off (or undershot) or, respectively, the electromagnetic actuation device is deactivated, the holding element is moved away from the locking position. As a result, the lock of the support element is released whereby the valve rod can again return independently or as a result of the restoring force into the first switching position.

In a preferred embodiment, the support device is designed to convert a holding force acting on the support device into a supporting force acting on the valve rod. The ratio of holding force to supporting force is nonlinearly dependent on the form of the support device and therefore on the deflection of the valve rod. The locking device is designed to transfer the holding force to the support element (only) by the holding element being moved into the locking position. In this state, the holding force transferred by the holding element to the support device is less than the supporting force acting on the valve rod. In this embodiment, the nonlinear behavior of the support device is used for locking said support device (and therefore the valve rod) using a relatively small holding force between the holding element and the support device. As a result, the holding force can be converted into a substantially larger supporting force between the support device and the valve rod. Similarly, a large application of force by the valve rod on the support device (=counteracting force with respect to supporting force) results in only a small application of force by the support element on the holding element (=counteracting force with respect to holding force). Thus, it is possible to again move the holding element away from the locking position in a reliable manner, in particular with relatively little expenditure of force.

The support device can particularly be disposed between the valve rod and a portion of a housing of the solenoid valve; thus enabling the support device to be supported at the housing. In addition, provision can be made for the longitudinal dimension of the support device to increase in size and in contrast for the lateral dimension to decrease in size when the valve rod is deflected from the first into the second switching position. In so doing, provision can be made for the decrease in size of the lateral dimension to initially enable the holding element to move into the locking position thereof. The holding element resting in this position against the support device can serve to counteract a lateral extension of said support device and thereby a reduction in the longitudinal dimension of the support device.

In a further preferred embodiment, the support device is designed as a toggle lever mechanism. Such an embodiment offers the possibility for implementing the nonlinear behavior of holding force in relation to the supporting force described above in a relatively simple manner.

In this respect, provision is made according to a further preferred embodiment for the support device to comprise a spring sleeve which includes two end sections and connecting webs that connect the end sections. The spring sleeve can, for example, be formed from a metallic material, for example spring steel. In such a relatively simple and cost effective embodiment of a resilient toggle lever mechanism, each of the connecting webs of the spring sleeve can be understood as an arrangement of two limbs of a toggle lever. Corresponding "pivot points" can be situated on the end sections and in the region of each connecting web. As a result, the spring sleeve can be pressed together axially in the first switching position of the valve rod and be extended radially outwards. When the valve rod is deflected into the second switching position, the spring sleeve can independently assume a shape which is substantially axially elongated and only slightly extended outwards and therefore have a smaller lateral dimension with respect to the first switching position. A high degree of rigidity can be provided to the spring sleeve via the holding element that rests against said spring sleeve (only) in this state, whereby said sleeve can be prevented from being axially compressed. The holding force of the holding element can be converted via the spring sleeve into a relatively large supporting force that acts on the valve rod.

Instead of being embodied as a spring sleeve, a toggle lever mechanism can also be implemented in another manner. A possible example is a support device having two end sections, wherein the two end sections are connected via two adjacent limbs at two or more locations. Pivot points, for example in the form of integral hinges, can be provided between the adjacent limbs and respectively between a limb and an end section. In order for such a support device to independently distend in the axial direction, the support device can furthermore be designed to include an additional spring element between the two end sections.

In addition, other embodiments of a support device are also conceivable, in which a nonlinear behavior is likewise present. In this regard, provision is made in a further preferred embodiment for the support device to comprise two support elements that are connected via a hinge and can move or pivot relative to one another. A spring element is disposed between the support elements in order to position said support elements, when the valve rod is deflected from the first into the second switching position, such that the holding element can be moved into the locking position. Such a support device is likewise suitable for converting the holding force of the holding element into a relatively large supporting force acting on the valve rod.

This applies in a corresponding manner to a further preferred embodiment, according to which the support device comprises two support elements that can be displaced relative to one another. One of the support elements is connected via a hinge to the valve rod. The other of the two support elements is connected via a hinge to a fastening section provided on the solenoid valve. In addition, spring elements are disposed on the support elements in order to position said support elements upon deflecting the valve rod from the first into the second switching position such that the holding element can be moved into the locking position.

The electromagnetic actuation device preferably comprises a solenoid armature connected to the valve rod, a yoke and a field coil. A return spring is disposed between the solenoid armature and the yoke. The solenoid armature and the yoke can be magnetized via the field coil; thus enabling an attraction to be produced between the solenoid armature and the yoke against the restoring force of the return spring and in so doing the valve rod to be deflected from the first into the second switching position.

In a further preferred embodiment, the locking device comprises a spring element for moving the holding element into the locking position, an armature element that can be moved with respect to the valve rod and a further return spring. The movable armature element is supported at the holding element that is used for locking the support device. The further return spring is disposed between the movable armature element and the solenoid armature disposed on the valve rod. The movable armature element can (likewise) be magnetized via the field coil; thus enabling an attraction to be produced between the movable armature element and the solenoid armature against the restoring force of the further return spring and thereby the holding element to be moved via the associated spring element into the locking position. Such an embodiment of the locking device makes it possible to move the holding element reliably into the locking position at the support device upon activation of the electromagnetic actuation device (i.e. when current is supplied to the field coil). Upon deactivation of the actuation device, the holding element can again reliably be moved away from the locking position. The movable armature element and the solenoid armature are thereby pressed apart by means of the action of the further return spring, whereby the movable armature element can press the holding element away from the locking position thereof.

The locking of the support device and therefore the valve rod enables an energy supply to the solenoid valve or, respectively, a current supply to the field coil to be greatly reduced after the valve rod has been deflected into the second switching position. The attraction between the movable armature element and the solenoid armature disposed on the valve rod can be maintained by means of the reduced or minimal energization of the field coil; thus enabling the holding element to remain in the locking position. The small energization of the field coil further allows said coil to be dimensioned substantially smaller in relation to a conventional solenoid valve.

The previously described support between the movable armature element and the holding element is preferably implemented via a movable sleeve. In addition, the holding element is preferably designed in the shape of an annular disc. In one such embodiment, the holding element can reliably enclose the support device in the locking position.

The solenoid valve can, for example, be a changeover valve. In so doing, the valve can have two closing elements, in particular in the form of sealing cones, which are rotated relative to one another through 180 degrees, at different positions on the valve rod. In the first switching position, one of the closing elements can thereby rest against an associated valve seat of the solenoid valve and close the same; whereas a further valve seat is not closed. By the valve rod being deflected into the second switching position, the previously closed valve seat can be opened and the further valve seat can be closed by the other of the two closing elements, a changeover function thus being implemented.

The solenoid valve can furthermore be designed in the form of a cut-off valve. In so doing, a single closing element is provided on the valve rod. An embodiment that is preferred in this regard includes the fact that the support device is disposed at one end of the valve rod. The valve rod has a closing element at an opposite end, which closing element is movable and is resiliently disposed on the valve rod with the aid of a spring element. Component tolerances can be compensated by means of such a resilient arrangement of the closing element which can interact with a corresponding valve seat of the valve.

According to the invention, a solenoid valve is further proposed which comprises an electromagnetically actuated valve rod. The valve rod can be deflected starting from a first switching position into a second switching position. The solenoid valve further comprises locking means, via which a holding force can be converted into a supporting force that acts on the valve rod. The ratio of holding force to supporting force is nonlinearly dependent on the deflection of the valve rod. The locking means are designed to provide the holding force (only) in one state, in which the valve rod is located in the second switching position, and to convert said holding force into the supporting force acting on the valve rod. In so doing, the holding force provided by the locking means is smaller than the supporting force acting on the valve rod.

With the aid of the locking means, the valve rod can be locked in the second switching position and thereby held reliably in said position. The lock can thus be implemented with a relatively small holding force, which can be converted into a (substantially) larger supporting force acting on the valve rod due to the nonlinear behavior. The lock enables an energy supply to the solenoid valve, which energy supply is used for deflecting the valve rod, to be largely reduced after the second switching position has been achieved. Essentially only the maintenance of the lock via the locking means can be associated with the reduced (or a minimal) electrical energy supply. At the same time, a secure function in the case of a fault can be provided. To this end, provision can be made, in the event of the energy supply being interrupted (or not fully met), for the locking means to no longer provide a holding force (an thus no longer a sufficient supporting force), whereby the valve rod can again independently or as a result of the influence of a restoring force return back to the first switching position.

The embodiments specified above can be used in an appropriate manner for the solenoid valve comprising the locking means. In particular, the locking means can be implemented in the form of a support device and in the form of a locking device comprising a holding element.

The advantageous embodiments of and modifications to the invention, which are explained above and/or reflected in the dependent claims, can be used individually or else in any desired combination with one another—except, for example in cases of unambiguous dependencies or incompatible alternatives.

BRIEF DESCRIPTION OF THE DRAWINGS

The invention is explained below in detail with the aid of the attached drawings. In the drawings.

DETAILED DESCRIPTION

Figure 1:
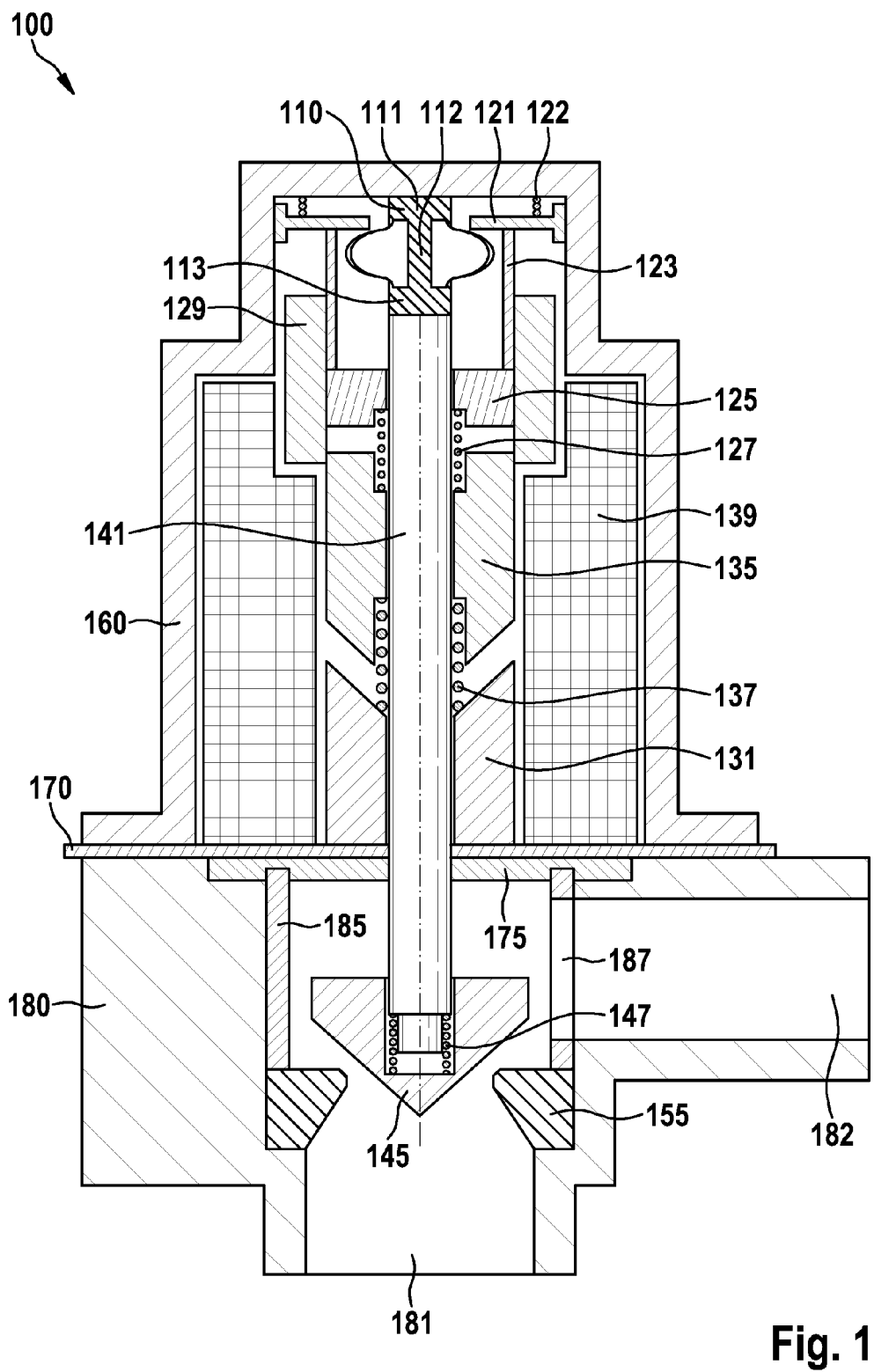
FIG. 1 shows a schematic side view of a solenoid valve comprising a spring sleeve as a support device, in an open state.

FIG. 1 shows a schematic side view of a solenoid valve 100 that can be electrically actuated in an open state. The valve 100, which is embodied as a cutoff-valve and can particularly be used in a coolant circuit of a motor vehicle, comprises two housing parts 160, 180. The housing parts 160, 180, which are also referred to below as pole pot or pole housing 160 and as valve housing 180, are connected to one another via a mounting plate 170 that is disposed between the same.

The valve housing 180, which is designed for the through-flow of a medium or, respectively, a coolant, encloses internal space and has two asymmetrically disposed ports 181, 182. The coolant delivered by means of a pump can be supplied to the valve housing 180 via the lower port 181 in FIG. 1 and can be discharged via the lateral port 182 (not depicted).

In the internal space, the valve housing 180 comprises a valve seat 155 and a closing element which is in the form of a sealing cone 145 and interacts with the valve seat 155. The valve seat 155 configured as a sealing ring can be formed from an elastomer material. A spacer sleeve 185 is disposed in the valve housing 180 for fixing the valve seat 155. With the help of said sleeve, the valve seat 155 is braced against a stop of the valve housing 180 which is located in the region of the lower port 181. The spacer sleeve 185 has an opening 187 which is adapted to the lateral port 182. As is further indicated in FIG. 1, a sealing collar 175 is provided on the underside of the mounting plate 170, said collar lying on the spacer sleeve 185 and pressing said spacer sleeve 185 towards the valve seat 155.

The sealing cone 145 is disposed at a lower end of a displaceably mounted valve rod 141. The valve rod 141 can be deflected starting from the first switching position (initial position or "rest position"), which is shown in FIG. 1 and in which the sealing cone 145 and the valve seat 155 are spaced apart from one another, into a second switching position (see FIG. 2). This operation is carried out electromagnetically. In the second switching position, the sealing cone 145 rests against the valve seat 155, whereby the valve 100 is closed and a volume flow is no longer possible between the ports 181, 182. Starting from the second switching position, the lift rod or valve rod 141 can again be put back into the first switching position.

As is further depicted in FIG. 1, the sealing cone 145 has a recess in which an end section of the valve rod 141 is accommodated. A spring element 147 is further disposed within the recess between the valve rod 141 and an opposing base area of the recess. As a result, the sealing cone 145 is displaceably and resiliently disposed on the valve rod 141 in the axial direction (i.e. with respect to a longitudinal axis of the valve rod 141), whereby component tolerances can be compensated. The spring element 147 can, for example, be designed as a coil spring as indicated in FIG. 1 or alternatively as a leaf spring.

The deflection of the valve rod 141 from the first into the second switching position and the return or reset thereof into the second switching position is brought about with the aid of components disposed in the pole housing 160. The valve rod 141 is therefore fed through corresponding openings in the sealing collar 175 and the mounting plate 170 into the interior of the pole housing 160. In order to seal the feed through, the sealing collar 175 can be embodied as a sealing bushing in the region of the valve rod 141 or can comprise such a bushing (not depicted).

The deflection of the valve rod 141 from the first into the second switching position is carried out by an electromagnetic actuation device, which comprises a solenoid armature 135 connected to the valve rod 141, a yoke 131 (opposite pole) disposed at or fastened to the mounting plate 170 and a field coil 139 enclosing said components 131, 135. The yoke 131 and the solenoid armature 135 are formed from ferromagnetic material and have a substantially (hollow) cylindrical shape. The valve rod 141 is thereby fed in a central position thereof through the yoke 131 serving as a guide sleeve, and the solenoid armature 135 is fastened peripherally to the valve rod 141. The joke 131 further has a cone-shaped recess on an upper side. The solenoid armature 135 has a conical section on an underside, said conical section corresponding in the contour thereof substantially to the contour of the cone-shaped section of the yoke 131. A return spring 137 is further disposed in this region between the joke 131 and the solenoid armature 135, which return spring pushes said two components 131, 135 apart and can thereby effect an opening of the valve 100 or a holding of the same in the first or open switching position. The return spring 137 can, for example, be designed as a coil spring as is indicated in FIG. 1.

Figure 2:
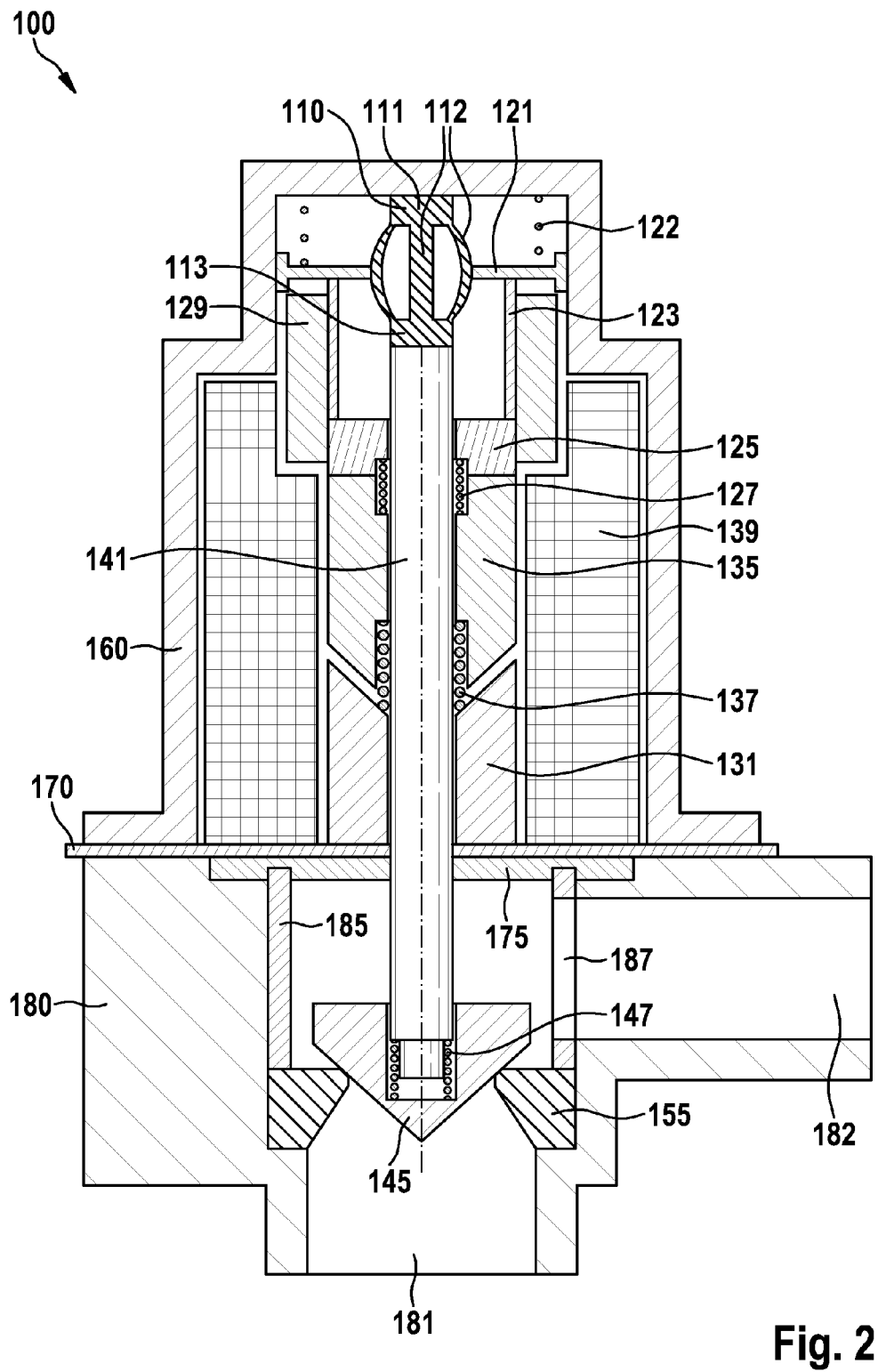
FIG. 2 shows a schematic side view of the valve from FIG. 1 in a closed state.

In order to activate the actuation device, current is supplied to the field coil 139. In so doing a magnetic field can be generated, whereby the yoke 131 and the solenoid armature 135 are magnetized and an electromagnetic attractive force can be induced between said components 131, 135. In this way, the solenoid armature 135 disposed on the valve rod 141 can be pulled in the direction of the yoke 131, and the valve rod 141 can thereby be displaced into the second switching position shown in FIG. 2, in which the sealing cone 145 rests against the valve seat 155. The electromagnetic force acts against a restoring force which is induced by the return spring 137 as well as (if applicable) by the hydraulic pressure of a medium or coolant acting on the port 181 on the underside. In the closed valve state, a residual distance between the solenoid armature 135 and the yoke 131 can be present as depicted in FIG. 2, whereby component tolerances can be compensated. Provided the field coil 139 is deenergized or switched off, the valve rod 141 can again return to the first switching position shown in FIG. 1, in which the valve 100 is open, due to the influence of the restoring force (and the deactivation of a locking function as will be described further below).

In the case of a conventionally constructed solenoid valve, the maintenance of the closed state (against the restoring force) requires a relatively large, permanent current supply to the respective field coil. Because no mechanical work is performed in said closed state, the electrical power consumed by the coil is completely converted into heat, which is consequently associated with a high power loss. A conventional solenoid valve has further a design that is predetermined by this thermal boundary condition, in particular having relatively large dimensions of the associated field coil. The valve 100 shown in FIGS. 1 to 3 is in contrast designed having a support device for supporting the valve rod 141 and having a locking device for locking the support device in the closed (energized) switching position, whereby a large, permanent current consumption can be prevented.

Figure 3:
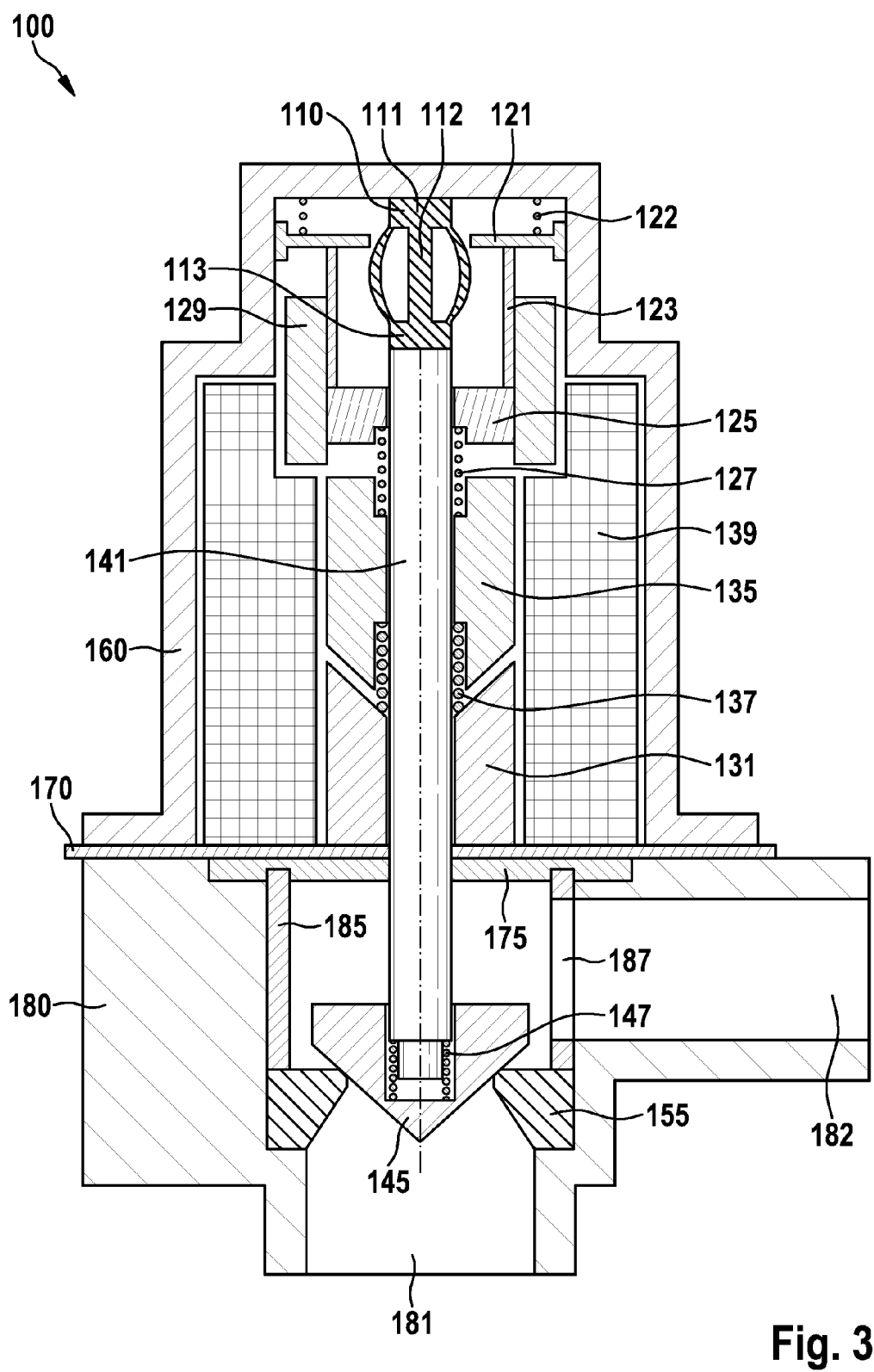
FIG. 3 shows a schematic side view of the valve from FIG. 1 in a transition state between the closed and the open state.

In the case of the valve 100, the support device is designed as a toggle lever mechanism, which is implemented in the form of a spring sleeve 110 as depicted in FIGS. 1 to 3. The spring sleeve 110 is disposed between the valve rod 141 and an upper end of the pole housing 160; thus enabling the spring sleeve 110 to be supported at the valve rod 141 as well as on the inside at the pole housing 160. The spring sleeve 110 comprises two hollow cylindrical or annular end sections 111, 113 and a plurality (for example: three, four or five) of connecting webs 112 that connect the end sections 111, 113. The end section 111 is disposed on the housing 160, and the other end section 113 is disposed at the upper end of the valve rod 141.

The spring sleeve 110, which can be manufactured, for example, in a simple and cost effective manner from a metallic material such as, in particular, spring steel, has the form of a Chinese lantern due to the connecting webs 112 and the recesses in the lateral surface thereof and due to a curvature directed (radially) outwards. A curvature of the spring sleeve 110 is present in the open as well as in the closed switching state of the valve (see FIGS. 1 and 2).

The connecting webs 112 of the spring sleeve 110 act like leaf spring legs so that the spring sleeve 110 contracts in the axial direction (i.e. with respect to a longitudinal extension of the sleeve 110 or to an adjustment travel of the valve rod 141) when force is applied and the connecting webs 112 expand ("bulge") outwardly in a transverse direction upon said application of force. Each of the connecting webs 112 can be understood as an arrangement of two adjacent limbs of a toggle lever, wherein corresponding "pivot points" can be located at the transition of the connecting webs 112 to the end sections 111, 113 and in a central region of each connecting web 112. In the first switching position of the valve rod 141 that is shown in FIG. 1, the spring sleeve is situated in an axially compressed and outwardly expanded state. As a result, the spring sleeve 110 is pressed by the valve rod 141 against the pole housing 160. The spring sleeve 100 is dimensioned such that, in the event of the spring sleeve 110 longitudinally contracting by the length of the adjustment travel of the valve rod 141, the lateral extension of said spring sleeve 110 is substantially larger than the longitudinal contraction due to the toggle lever effect. When the valve rod 141 is deflected into the second switching position as illustrated in FIG. 2, the spring sleeve 110 can independently assume the depicted, substantially axially elongated shape having a slight curvature, whereby the spring sleeve 110 has with respect to the first switching position a larger longitudinal dimension and a smaller lateral dimension. The curvature outwards, which is also present in this state, serves to predefine the lateral extension behavior of the spring sleeve in order to particularly prevent the connecting webs 112 from bending towards the inside.

The locking device of the solenoid valve 100, with the help of which the spring sleeve 110 used to support the valve rod 141 can be locked, comprises, as is shown in FIG. 1, an axially displaceable holding element 121, a spring element 122 disposed between the holding element 121 and the upper section of the pole housing 160, an armature element 125 that encloses the valve rod 141 and is axially displaceable with respect to said valve rod 141 and a further return spring 127. The holding element 121 that is supported by means of the spring element 122 at the pole housing 160 can be moved starting from the initial position shown in FIG. 1 into a locking position when closing the valve 100 with the aid of the spring element 122. The holding element 121 rests against the spring sleeve 110 or encloses the same (see FIG. 2) in said locking position. This will be discussed in greater detail below. The holding element 121 has a disc-shaped or annular base section which surrounds an (axial) circular opening. On the outside, the holding element 121 has an edge section that extends perpendicularly to the base section, across which edge section the holding element 121 can slide on the inside along the pole housing 160.

The armature element 125, which is formed from a ferromagnetic material, is supported by means of an axially displaceable sleeve 123 at the holding element 121. The sleeve 123 and the spring element 122 are thereby disposed at opposite sides of the holding element 121. The holding element 121 and the sleeve 123 can both be constructed from a plastic material. The further return spring 127 is disposed between the movable armature element 125 and the solenoid armature 135 arranged on the valve rod 141 and can exert a force on said two armature elements 125, 135 which acts to pull them apart. As is indicated in FIGS. 1 to 3, the further return spring 127 and the spring element 122 can be embodied in the form of coil springs. In addition, an enclosing guide sleeve 129 is provided in the pole housing 160 for mechanically guiding the movable armature element 125 and the movable sleeve 123. In so doing, said armature element 125 and said sleeve 123 can move axially within the guide sleeve 129. Said guide sleeve 129 is likewise constructed from a ferromagnetic material.

The spring sleeve 110 and the individual springs 122, 127, 137 are adjusted with regard to the spring effects thereof such that the valve 100 in the currentless state also assumes the open switching position shown in FIG. 1 or is held in said position without being influenced by a coolant pressure acting on the port 181. To this end, the spring constant K137 of the return spring 137 is greater than the sum of the spring constants K110, K122, K127 of the spring sleeve 110 and of the springs 122, 127, i.e.

$$K137 > (K110 + K122 + K127).$$

In addition, the further return spring 127 has a larger spring constant than the spring element 122, i.e.

$$K127 > K122,$$

whereby the holding element 121 can be moved away from the locking position in the currentless state of the coil 139.

The functionality of the spring sleeve 110 and the locking thereof is described below in detail using a closing operation of the valve 100. The valve 100 is thereby initially located in the (first) open or currentless switching state shown in FIG. 1. In order to close the valve 100, a magnetic field is generated by supplying current to the field coil 139, whereby the yoke 131, the solenoid armature 135 and the movable armature element 125 are magnetized. Due to the attractive force that occurs in the process between the solenoid armature 135 and the yoke 131, the valve rod 141 is moved downwards into the (second) closed switching position shown in FIG. 2 while compressing the return spring 137. In addition, an attractive force is present between the movable armature element 125 and the solenoid armature 135, whereby the armature element 125 is moved towards the solenoid armature 135 while compressing the further return spring 127. In so doing, the guide sleeve 129 can bring about the guidance of magnetic field lines between the pole housing 160 and the movable armature element 125.

In the closed state of the valve 100, the sealing cone 145 is pressed via the valve rod 141 with a sufficiently large sealing force against the valve seat 155, which force is greater than a predetermined minimum force. The minimum force, which can, for example, be 20N, is determined by the counteracting force which can substantially be induced by the return spring 137 and the hydraulic coolant pressure. In this state, the spring element 147 disposed between the sealing cone 145 and the valve rod 141 is (somewhat) tensioned or contracted. (Axial) component tolerances can be compensated via the spring element 147; thus enabling the sealing cone 145 to be held with the intended sealing or closing force against the valve seat, and thereby enabling the valve 100 to be securely closed.

The movement or deflection of the valve rod 141 into the closed or second switching position further has the consequence that the spring sleeve 100, starting from the compressed state, can axially expand (see FIG. 2). The associated lateral contraction of the spring sleeve 110 results in said spring sleeve 110 tapering to a smaller lateral dimension or to a minimum diameter. Because the movable armature element 125 is additionally pulled in the direction of the solenoid armature 135, the spring element 122 that is supported at the housing section of the pole housing 160 (and was previously contracted) can expand and thereby press the holding element 121 together with the sleeve 123 away from the relevant pole housing section. In this way, the holding element 121 is moved starting from the initial position shown in FIG. 1 into the locking position in which the holding element 121 rests against the spring sleeve 110. In the locking position, the holding element 121 is, as shown in FIG. 2, is centrally (i.e. with respect to the axial direction) arranged on the spring sleeve 110, which can be achieved by means of an appropriate embodiment of the valve 100, in particular of the length of the sleeve 123 located between the holding element 121 and the armature element 125. The holding element 121 or the internally situated opening thereof is dimensioned such that only the reduction of the lateral dimension of the spring sleeve 110 enables the movement into the locking position.

In the locking position, the spring legs or connecting webs 112 of the spring sleeve 110 can be supported at an edge surrounding the opening of the holding element 121 or at an internal lateral surface that is present here. In this way, the holding element 121 can provide an adequate holding force which counteracts a lateral extension and thus an axial compression of the spring sleeve 110; thus enabling the spring sleeve 110 to obtain a relatively high degree of axial rigidity. The valve rod 141 can therefore be supported on the spring sleeve 110, whereby the valve 100 can be held closed in a reliable manner.

The closing force of the valve 100 is now—in contrast to a conventional solenoid valve—no longer solely dependent on the magnetic attraction between the solenoid armature 135 and the yoke 131 but additionally on the locking of the valve rod 141 achieved with the aid of the holding element 121 and the spring sleeve 110. As a result, it is possible to largely reduce the supply of current to the field coil 139 after the closed valve state and activation of the locking of the valve rod 141 have been achieved. For example, it is possible to reduce the electrical current by approximately 90% to approximately a tenth of an initial value (i.e. of a current value during the closing process). The reduced or minimum current supply to the coil results substantially solely for the purpose of retaining the holding element 121 in the locking position. The electrical current ("holding current") is therefore determined substantially by the attractive force between the movable armature element 125 and the solenoid armature 135, the spring constants of the return spring 127 and the spring element 122 and by the frictional force between the spring sleeve 110 and the holding element 121.

The locking of the valve rod 141 as per the previously described mechanism additionally offers the possibility of dimensioning the field coil 139 of the valve 100 substantially smaller with respect to a conventional solenoid valve. In so doing, the dynamics of the closing process as well as the closing force of the valve can remain unchanged or, as the case may be, even be increased.

In order to open the valve 100, the minimum supply of current to the field coil 139 is undershot or switched off. This results in the attractive force between the movable armature element 125 and the solenoid armature 135 sinking or falling off to such an extent that the return spring 127 located between said two components can displace the movable armature element 125 and thereby the sleeve 123 and the holding element 121 axially upwards against the force of the spring element 122, as is shown in FIG. 3. This is possible because the spring constant K127 as specified above is greater than the spring constant K122. The holding element 121 is therefore moved away from the locking position thereof, whereby the connecting webs 112 of the spring sleeve 110 can no longer be supported on the inner lateral surface of the holding element 121 and as a result the spring sleeve 110 loses the high axial rigidity thereof. In this way, the solenoid armature 135 and thus the valve rod 141 can be moved upwards into the first switching position while compressing the spring sleeve 110 due to the influence of the of the return spring 137 (and possibly due to the influence of a coolant pressure), whereby the valve 100 can again assume the open state shown in FIG. 1. This opening mechanism implements a reliable behavior in the event of a fault or, respectively, a fail-safe function of the valve 100 because said mechanism is automatically triggered in the event of faults (for example: voltage drop, loss of contact, etc.).

In the open valve state, the sealing cone 145 is (again) separated from the valve seat 155. To this end, the adjustment travel of the spring element 147 disposed between the sealing cone 145 and the valve rod 141 is dimensioned such that the maximum axial tolerance of the valve 100 is not exceeded, and thereby the opening stroke of the sealing cone 145 and a cross-sectional surface area of the valve 100 specified for the volume flow are not undershot.

The spring sleeve 110 which acts as a toggle lever mechanism and is supported at the pole housing 160 can basically convert an externally acting holding force, which can act radially or laterally on the connecting webs 121, into a supporting force that acts axially on the valve rod 141. Due to the toggle lever effect, the ratio of holding force to supporting force is nonlinearly dependent on the respective (contracted) shape of the spring sleeve 110 and hence on the deflection of the valve rod 141. Said nonlinear behavior is used in the case of the valve 100 to implement the locking of the spring sleeve 110 and thus the valve rod 141 with a relatively small holding force. As described above, the holding force is transmitted here only in the axially elongated state of the spring sleeve 110 by the holding element that has been moved into the locking position onto the spring sleeve 110. In this state, the holding force transmitted by the holding element 121 onto the spring sleeve 110 is substantially smaller than the supporting force acting on the valve rod 141. By means of the spring sleeve 110, a relatively small holding force can therefore be converted into a relatively large supporting force which acts on the valve rod 141 and holds the valve 100 closed. Likewise a large application of force by the valve rod 141 onto the spring sleeve 110 (=counteracting force with respect to the supporting force) only results in a small application of force by the spring sleeve 110 onto the holding element 121 (=counteracting force with respect to the holding force). This makes it possible to again move the holding element 121 reliably and with relatively little effort away from the locking position with the aid of the return spring 127.

With regard to the possible reduction or minimization of the current supplied to the field coil, the significant influencing variables will be additionally examined below. In the closed and locked state of the valve 100, the magnetic attractive force acting between the armature element 125 and the solenoid armature 135 overcompensates for the resulting spring force of the springs 122, 127 that are working against each other. A minimum attractive force for maintaining the closed state can thus be achieved with a smallest possible difference between the spring constants of the springs 122, 127.

It must further be taken into account that the valve 100 can be exposed to vibrations depending on the mounting position thereof. This case is, for example, relevant if the valve 100 is disposed at a combustion engine of a motor vehicle. For that reason, the maintenance of the closed valve state requires that an acceleration force which occurs here and pulls the armature element 125 away from the solenoid armature 135 be likewise compensated by the magnetic attractive force. Because the attractive force exponentially increases when the distance between the armature element 125 and the solenoid armature 135 decreases, the minimization of the current consumption in the closed valve state can be promoted by a distance between the two armature elements 125, 135 which is as small as possible. In so far as a direct contact between the armature element 125 and the solenoid armature 135 is not possible during the closing process for reasons of noise emissions, a relatively thin, annular plastic disc (having a thickness of, for example, maximally 0.1 mm) can if need be disposed between the armature elements 125, 135 for noise damping purposes. The acceleration force acting on the movable armature element 125 can further be minimized as a result of the armature element 125 being dimensioned as small as possible and hence being light. By optimizing these influencing variables (i.e. dimensioning of the springs 122, 127, minimum distance between the armature elements 125, 135, dimensioning of the movable armature element 125), the possibility exists for the electrical current supplied to the valve 100 or, respectively, the holding current in the closed valve state to be reduced to less than 10% of the current that is supplied in the case of a conventional embodiment of the solenoid valve.

With regard to the valve 100, differently constructed support devices can also be used instead of the spring sleeve 110, which devices can be disposed in a comparable manner between the valve rod 141 and the upper section of the pole housing 160 and can be locked to the holding element 121 via the locking device as well. Possible embodiments are described in detail with the aid of the subsequent figures. It must be noted that with regard to details that have already been described and refer to similar or corresponding components and features (for example the functionality of the electromagnetic actuation device and the locking device of the valve 100), possible advantages etc., reference will be made to the previous embodiments.

Figure 4:
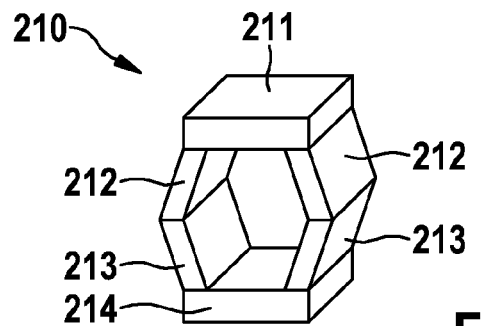
FIGS. 4 to 6 show schematic views of a further alternative support device which is designed in the form of a toggle lever mechanism.
Figure 5:
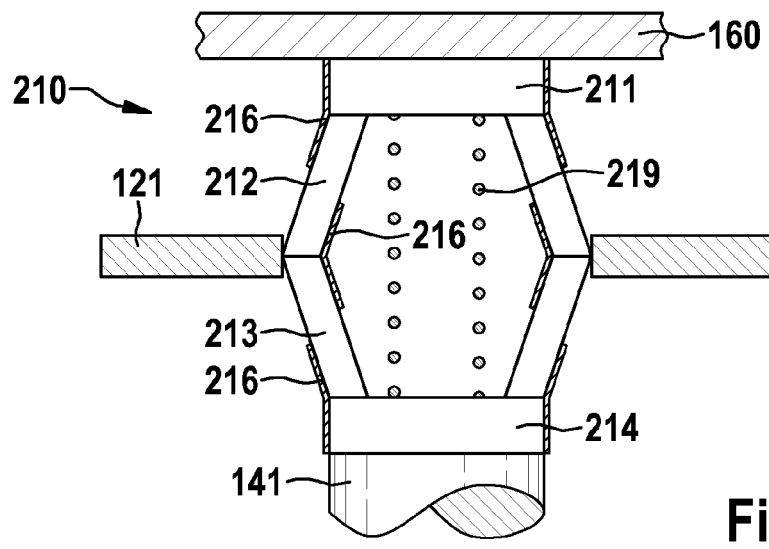
Figure 6:
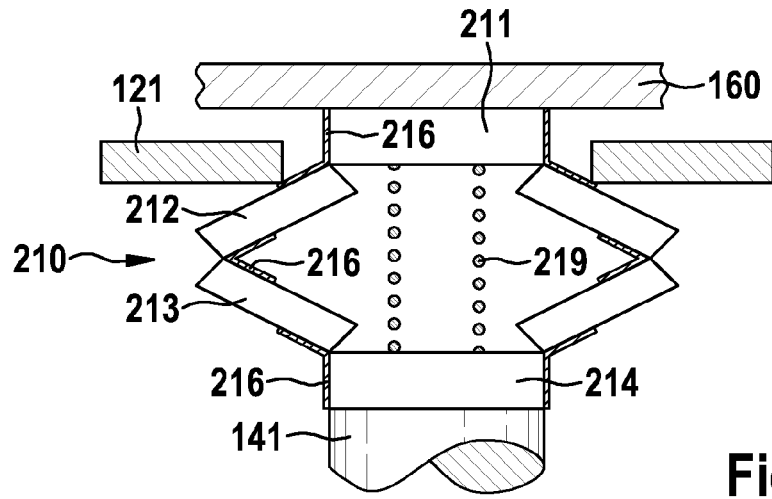

FIGS. 4 to 6 show a support device 210 in a perspective and side view which is directly designed in the form of a toggle lever mechanism. The support device 210 has two plate-shaped end sections 211, 214, between which two support structures in the form of adjacent side sections 212, 213 are disposed. The side sections 212, 213 form the limbs of a toggle lever. With regard to a use in the valve 100, the end section 211 can, for example, be disposed on the pole housing 160; and the other end section 214 can be disposed on the valve rod 141 as indicated in FIGS. 5 and 6.

As is further shown in FIGS. 5 and 6, the end sections 211, 214 are connected via integral hinges 216 to the side sections 212, 213. The adjacent side sections 212, 213 are also connected to one another via integral hinges 216. As a result, the side sections 212, 213 can be rotated and thereby deflected relative to each other and also with respect to the end sections 211, 214. The arrangement consisting of the end sections 211, 214, the side sections 212, 213 and the integral hinges 216 can, for example, be designed in the form of a plastic injection molded part.

The support device 210 further comprises a spring element 219 disposed between the end sections 211, 214, wherein said spring element can be in the form of a coil spring as indicated in FIGS. 5 and 6. Due to the restoring spring element 219, the support device 210 can independently assume the elongated shape shown in FIG. 5. Here the side sections 212, 213 on the sides of the support device 210 are aligned so as to extend (slightly) obliquely outwards which is caused by a parallelogram-like cross-sectional shape of the side sections 212, 213. By means of this embodiment, the lateral extension behavior of the support device 210 can be predefined, i.e. that the support device 210 comparable to the spring sleeve 110 only carries out a lateral extension when an axial force is applied. Such an application of force resulting in a longitudinal contraction, which can be induced by displacing the valve rod 141 resting against the end section 214 into the first switching position pursuant to FIG. 1, is shown in FIG. 6. In comparison to the state depicted in FIG. 5, the side sections 212, 213 are in this case angled more sharply outwards so that the support device 210 has a larger lateral dimension.

The support device 210 can therefore, similarly to the spring sleeve 110, be locked in the manner described above with the aid of the holding element 121. In the state shown in FIG. 6 (valve rod 141 in the first switching position, open valve 100), the holding element 121 is located in the initial position thereof. In order to close the valve 100, the valve rod 141 is deflected into the second switching position pursuant to FIG. 2 by energizing the field coil 139. The support device 210 can thus pass into the elongated state shown in FIG. 5, in which the support device 210 has a minimal lateral dimension. As a result, the holding element 121 can be moved into the locking position, in which the holding element 121 can rest in a central position against the support device 210 or, respectively, against the side sections 212, 213. The holding element 121 or more precisely the internal opening thereof is dimensioned such that only the reduction of the lateral dimension of the support device 210 enables the movement into the locking position. Depending on the shape of the support device 210, the holding element can, for example, have in this case a rectangular or square opening instead of the circular opening described above.

In the locking position, the holding element 121 can provide a corresponding holding force that counteracts a lateral extension and an axial compression of the support device 210. As a result, the support device has a relatively high degree of axial rigidity; thus enabling the valve 100 to be held closed in a reliable manner. In so doing, it is once again possible to reduce the current supply to the field coil 139 to a minimum value. If said minimum current supply to the coil is cut off (or is undershot) and as a result the holding element 121 is moved away from the locking position, the support device 210 loses the high degree of rigidity. For that reason, the support device 210 can (against the force of the spring element 219) be axially compressed, whereby the valve rod 141 can return into the first switching position.

Due to the toggle lever effect, the support device 210 supported at the pole housing 160 likewise exhibits a relationship between a holding force acting externally on the support device 210 or, respectively, on the side sections 212, 213 thereof and a supporting force acting on the valve rod 141 which is nonlinearly dependent on the deflection of the valve rod 141. The holding force provided by the holding element 121 is substantially smaller than the supporting force in the axially elongated state of FIG. 5. Hence, the release of the lock, by means of which the holding element 121 is moved away from the locking position thereof, can be carried out with a relatively small expenditure of force.

A support device having a nonlinear transmission behavior can also be implemented in another manner than by means of the toggle lever mechanism. Possible embodiments are described with the aid of the subsequent figures.

Figure 7:
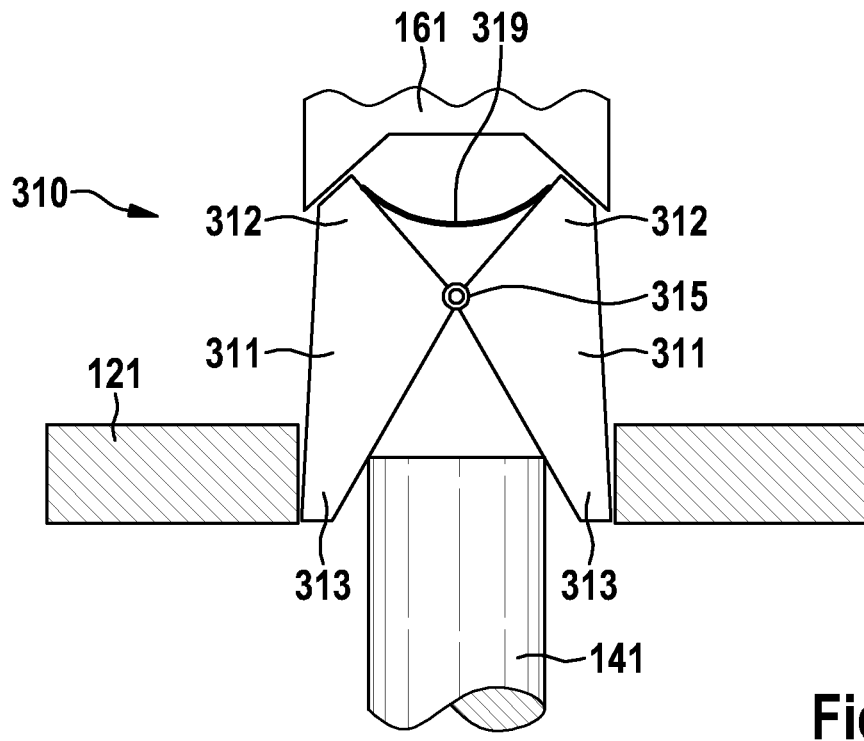
FIGS. 7 & 8 show schematic views of a further alternative support element which comprises two support elements connected via a hinge.
Figure 8:
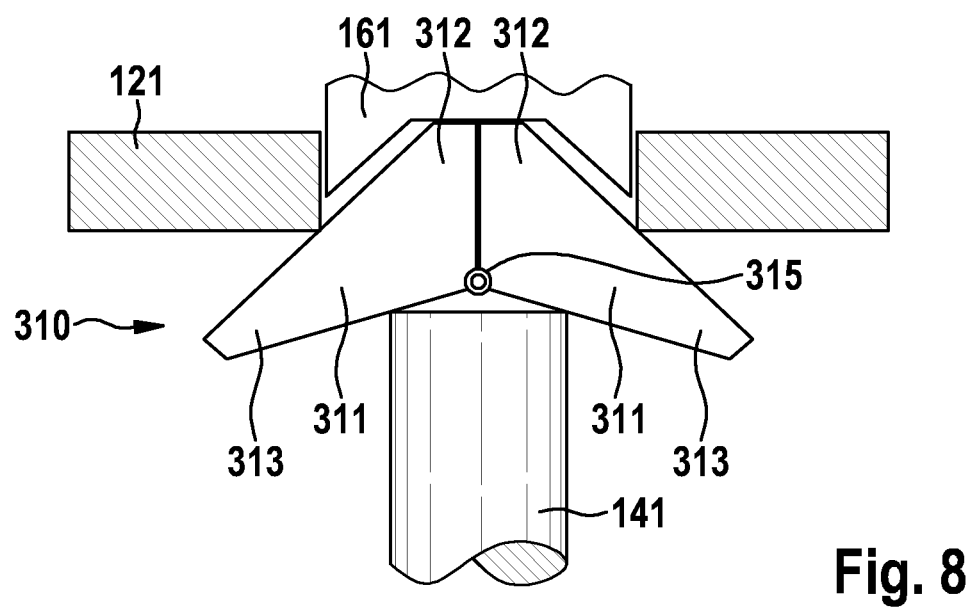

FIGS. 7 and 8 show a side view of a further support device 310 which has substantially triangular support elements 311 that are arranged mirror-symmetrically to one another. The support elements 311 are connected via a hinge 315 to one another at "corner points" which face each other and can therefore be moved or pivoted relative to one another. Within the scope of the application in the valve 100, the valve rod 141 is supported on the inside between wedge-shaped partial sections 313 of the support elements 311. At a side opposite thereto, the support elements 311 comprising wedge-shaped partial sections 312 are supported at the pole housing 160, i.e. at or within a receiving structure 161 provided here. The receiving structure 161 comprises a trapezoidal recess having wall sections which extend obliquely outwards. Similarly, the partial sections 312 of the supporting elements 311 are provided with beveled ends. A simplified sliding of the partial sections 312 during the rotational movement of the support elements 311 is enabled by this embodiment of the receiving structure 161 and the partial sections 312.

The support element 310 further comprises a spring element 319 which is disposed between the partial sections 312 of the support elements 311 and can be embodied in the form of a (bent) leaf spring as is indicated in FIG. 7. By means of the restoring spring element 319, the support elements 311 can be independently rotated into the position shown in FIG. 7 so that the support device 310 has an axially elongated, expanded shape.

By means of an axial application of force that is induced by displacing the valve rod 141 disposed between the partial sections 313 of the support elements 311 into the first switching position pursuant to FIG. 1, the support elements 311 can be rotated into the position shown in FIG. 8. In so doing, the partial sections 313 of the support elements 311 are pressed apart—and the partial sections 312, while compressing the spring element 319, are pressed on top of each other or against each other. In the state depicted in FIG. 8, the support device 310 has a larger lateral dimension with respect to the state depicted in FIG. 7.

As a result, the support device 310 can likewise be locked with the aid of the holding element 121 in the manner described above. In the state shown in FIG. 8 (valve rod 141 in the first switching position, open valve 100), the holding element 121 is located in the initial position thereof. In order to close the valve 100, the valve rod 141 is deflected into the second switching position pursuant to FIG. 2 by energizing the field coil 139. The support elements 311 can thereby be rotated via the spring element 319 into the position depicted in FIG. 7, in which position the ends of the partial sections 313 lie relatively close to one another and consequently the support device 310 has a small(er) lateral dimension. As a result, the holding element 121 can be moved into the locking position, in which said holding element 121 can rest externally against the support device 310 or against the ends of the partial sections 313. The holding element 121 or more precisely the internal opening thereof is dimensioned such that only the rotational movement of the supporting elements 311 into the position shown in FIG. 7 enables the movement into the locking position. Depending on the shape of the support device 310, the opening of the holding element 121 can also have, for example, a rectangular or square contour in this case.

In the locking position, the holding element 121 can provide a corresponding holding force which counteracts an opposite rotation of the support elements 311. As a result, the support device 310 has a relatively high degree of stability or rigidity, whereby the valve 100 can be held closed in a reliable manner. The current supply to the field coil 139 can therefore also be reduced to a minimum value in this case. If the minimum supply of current to the field coil is cut off (or is undershot) and consequently the holding element 121 is moved away from the locking position, the support device 310 loses the high degree of rigidity. The valve rod 141 can therefore again press the partial sections 313 apart and rotate the support elements 311 into the position shown in FIG. 8, thus enabling the valve rod 141 to return into the first switching position while the support device 310 is being axially "reduced in size".

The support device 310 supported at the pole housing 160 or at the receiving structure 161 likewise exhibits a relationship between a holding force acting externally on the support device 310 or, respectively, on the partial sections 313 and a supporting force acting on the valve rod 141 which is nonlinearly dependent on the deflection of the valve rod 141. In the axially expanded state of FIG. 7, the holding force provided by the holding element 121 is substantially smaller than the supporting force. The release of the lock can therefore be carried out with a relatively small expenditure of force.

Figure 9:
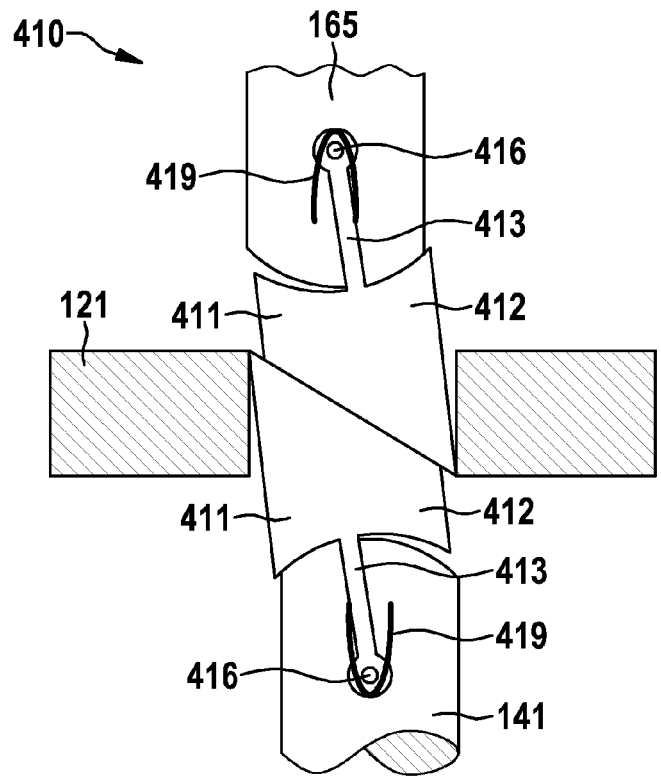
FIGS. 9 & 10 show schematic views of a further alternative support device which comprises two support elements that can be displaced relative to one another.
Figure 10:
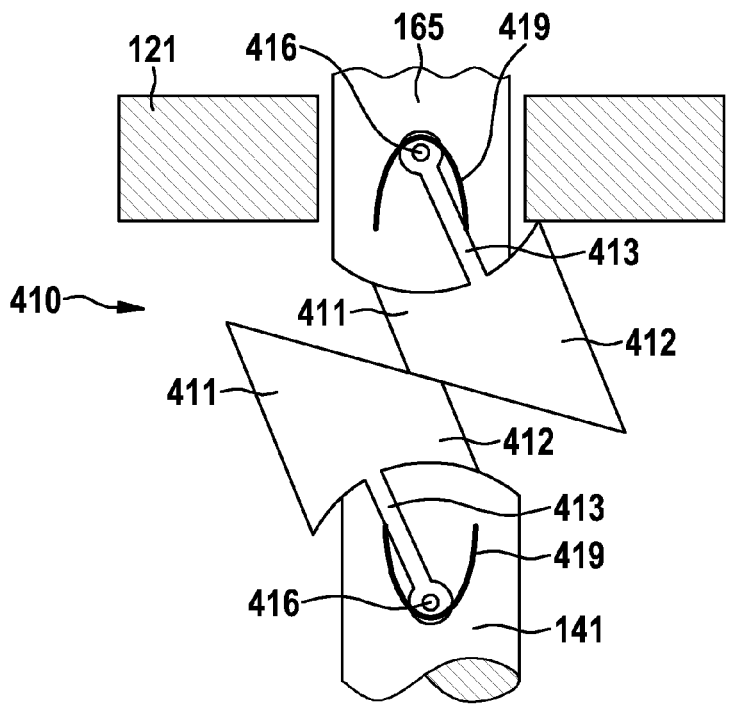

FIGS. 9 and 10 show a side view of a further support device 410 which comprises two support elements 411 that can be displaced relative to one another. The support elements 411 have substantially wedge-shaped partial sections 412, on the obliquely extending front faces of which the support elements 411 can slide along each other. One of the support elements 411 is rotatably arranged and supported on the valve rod 141, and the other of the two support elements 411 is rotatably arranged and supported on the pole housing 160 or, respectively, on a fastening section 165 provided here. To this end, the support elements 411 have web-shaped partial sections 413 extending from the partial sections 412. Hinges 416 are provided on the ends of the web-shaped partial sections 413 for the rotatable connection to the valve rod 141 and to the fastening section 165. In so doing, one or also two of such partial sections 413 located at opposite sides of the valve rod 141 and the fastening section 165 can be provided per support element 411. In order to improve the support and the guidance of the rotatable support elements 411, the partial sections 412 as well as the end of the valve rod 141 and the end of the fastening section 165 are configured having curved or part-circular contact surfaces that are matched to one another.

The support device 410 furthermore comprises two spring elements, which are disposed in the region of the two hinges 416 and can be present in the form of arcuate leaf springs. With the aid of the restoring spring elements 419, which can rest with one end against the web-shaped partial sections 413, the support elements 411 can independently be rotated into the position shown in FIG. 9 in which the support device 410 has an axially elongated or expanded shape.

The support elements 411 can be rotated into the position shown in FIG. 10 by means of an axial application of force that is induced by displacing the valve rod 141 into the first switching position pursuant to FIG. 1. In the process, the support elements 411 are rotated in directions opposite each other or, respectively, are rotated away from each other while pressing the spring elements 419 apart, wherein the support elements 411 can slide along each other on the oblique surfaces of the partial sections 412. In the state depicted in FIG. 10, the support device 410 has a larger lateral dimension in relation to the state depicted in FIG. 9.

Due to this functionality, the support device 410 can be locked in the manner described above with the aid of the holding element 121. In the state shown in FIG. 10 (valve rod 141 in the first switching position, open valve 100), the holding element 121 is located in the initial position thereof. In order to close the valve 100, the valve rod 141 is deflected into the second switching position pursuant to FIG. 2 by energizing the field coil 139. With the aid of the spring elements 419, the support elements 411 can be rotated here towards each other and therefore into the position shown in FIG. 9 so that the support device has a small(er) lateral dimension. The holding element 121 can thereby be moved into the locking position, in which the holding element 121 can rest externally against the support device 410 or, respectively, against the ends of the partial sections 412. The holding element 121 or more precisely the internal opening thereof is dimensioned such that only the rotational movement of the support elements 411 into the position shown in FIG. 9 enables the movement into the locking position. Depending on the shape of the support device 410, the opening of the holding element 121 can have, for example, a rectangular or square contour.

In the locking position, the holding element 121 can provide a corresponding holding force which counteracts a rotational movement of the support elements 411 directed against the same. The support device 410 consequently has a relative high degree of stability; thus enabling the valve 100 to be held closed in a reliable manner. It is therefore possible to reduce the current supply to the field coil 139 to a minimum value. If the minimum supply of current is cut off (or is undershot) and as a result the holding element is moved away from the locking position, the support device 410 loses the high degree of rigidity. Hence, the valve rod 141 can again press or rotate the support sections 411 apart, whereby the valve rod 141 can again be returned into the first switching position while the support device 410 is being axially "reduced in size".

The support device 410 supported at the pole housing 160 or, respectively, at the fastening section 165 likewise exhibits a relationship between a holding force acting externally on the support element 410 or, respectively, on the partial sections 412 and a supporting force acting on the valve rod 141 which is nonlinearly dependent on the deflection of the valve rod 141. In the axially elongated state of FIG. 9, the holding force provided by the holding element 121 is substantially smaller than the supporting force. The release of the lock can therefore occur with a relatively small expenditure of force.

The embodiments described with the aid of the figures represent preferred or exemplary embodiments of the invention. Instead of the described embodiments, further embodiments are conceivable which can comprise further modifications to the features described. In particular, it is conceivable to implement differently structured support devices in which a nonlinear behavior can likewise exist between a holding force and a supporting force. Said nonlinear behavior can therefore similarly be used in a locked state to convert a holding force into a substantially larger supporting force that acts on the valve rod.

A different construction is also conceivable for a locking device or more precisely a holding element of such a locking device. For example, a holding element can be provided which has an abutment portion only at one position or in a certain region. In the locking position of such a holding element, the abutment portion can rest against a support device in order to counteract a lateral extension of the support device and thereby lock said support device.

In addition, the approaches described above are not only limited to currentless, open cut-off valves but can also be used with differently structured solenoid valve types. A possible exemplary embodiment is a changeover valve. Such a solenoid valve can comprise a first and a second closing element which are disposed at different positions on a valve rod. In a first switching position, the first closing element can rest against an associated first valve seat and close the same, whereas a second valve seat is not closed. By the valve rod (again induced by energizing a field coil) deflecting into the second shifting position, the previously closed first valve seat can be opened and the second valve seat can be closed by the second closing element, a changeover function thereby being implemented. In this case, a holding element can be similarly moved into a locking position against a support device provided for supporting the valve rod, whereby the support device locks and thus the supply of current to the field coil can be reduced.

The invention claimed is:

1. A solenoid valve (100), comprising:
 a valve rod (141);
 an electromagnetic actuation device (131, 135, 139) for deflecting the valve rod (141) starting from a first switching position into a second switching position;
 a support device (110, 210, 310, 410) for supporting the valve rod (141), said device having a different form depending upon a deflection of the valve rod (141); and
 a locking device, which is configured to move a movable holding element (121) into a locking position upon activation of the electromagnetic actuation device (131, 135, 139) in order to deflect the valve rod (141) into the second switching position, wherein the holding element (121) lies against the support device (110, 210, 310, 410) when the holding element is in the locking position, and wherein the locking device is configured to move the holding element (121) away from the locking position upon deactivation of the electromagnetic actuation device (131, 135, 139).

2. The solenoid valve according to claim 1, wherein the support device (110, 210, 310, 410) is configured to convert a holding force acting on the support device (110, 210, 310, 410) into a supporting force acting on the valve rod (141), wherein a ratio of holding force to supporting force is nonlinearly dependent on the deflection of the valve rod (141), wherein the locking device (121, 122, 123, 125) is configured to transmit the holding force with the holding element (121) that has been moved into the locking position onto the support device (110, 210, 310, 410), and wherein the holding force transmitted by the holding element (121) onto the support device (110, 210, 310, 410) is smaller than the supporting force acting on the valve rod (141).

3. The solenoid valve according to claim 1, wherein the electromagnetic actuation device comprises a solenoid armature (135) connected to the valve rod (141), a yoke (131) and a field coil (139), wherein a return spring (137) is disposed between the solenoid armature (135) and the yoke (131), and wherein the solenoid armature (135) and the yoke (131) are configured to be magnetized via the field coil (139); thus enabling an attraction to be induced between the solenoid armature (135) and the yoke (131) against a restoring force of the return spring (137).

4. The solenoid valve according to claim 3, wherein the locking device comprises a spring element (122) for moving the holding element (121) into the locking position, an armature element (125) that is movable in relation to the valve rod (141) and a further return spring (127), wherein the movable armature element (125) is supported at the holding element (121), wherein the further return spring (127) is disposed between the movable armature element (125) and the solenoid armature (135), and wherein the movable armature element (125) is configured to be magnetized via the field coil (139) so that an attraction can be induced between the movable armature element (125) and the solenoid armature (135) against the restoring force of the further return spring (127) and the holding element (121) is configured to be moved by means of the spring element (122) into the locking position.

5. The solenoid valve according to claim 1, wherein the support device (110, 210) is a toggle lever mechanism.

6. The solenoid valve according to claim 1, wherein the support device comprises a spring sleeve (110) which has two end sections (111, 113) and connecting webs (112) that connect said end sections (111, 113).

7. The solenoid valve according to claim 1, wherein the support device (310) comprises two support elements (311) which are connected via a hinge (315) and are configured to be moved relative to one another, and wherein a spring element (319) is disposed between the support elements (311) in order to position said support elements (311) when the valve rod (141) is deflected into the second switching position such that the holding element (121) can be moved into the locking position.

8. The solenoid valve according to claim 1, wherein the support device (410) comprises two support elements (411) which are configured to be displaced relative to one another, wherein one of the support elements (411) is connected via a hinge (416) to the valve rod (141), wherein an other of the two support elements (411) is connected via a hinge (416) to a fastening section (165) provided on the solenoid valve, and wherein spring elements (419) are disposed on the support elements (411) in order to position said support elements (411) when the valve rod (141) is deflected into the second switching position such that the holding element (121) can be moved into the locking position.

9. The solenoid valve according to claim 1, wherein the support device (110, 210, 310, 410) is disposed at one end of the valve rod (141), and wherein the valve rod (141) has a closing element (145) at an opposite end, which closing element is movable and is resiliently disposed on the valve rod (141) with the aid of a spring element (147).

10. A solenoid valve comprising:
an electromagnetically actuated valve rod (141) which starting from a first switching position is configured to be deflected into a second switching position; and
locking means (110, 121, 122, 123, 125, 210, 310, 410) via which a holding force can be converted into a supporting force acting on the valve rod (141), wherein a ratio of holding force to supporting force is nonlinearly dependent on a deflection of the valve rod (141),
wherein the locking means (110, 121, 122, 123, 125, 210, 310, 410) are configured to provide the holding force in a state in which the valve rod (141) is located in the second switching position and to convert said holding force into a supporting force, and wherein the holding force provided is smaller than the supporting force acting on the valve rod (141).

* * * * *